United States Patent [19]
Sasaki et al.

[11] Patent Number: 5,155,424
[45] Date of Patent: Oct. 13, 1992

[54] NUMERICAL CONTROL METHOD

[75] Inventors: Tako Sasaki; Kentaro Fujibayashi, both of Tokyo; Masahiko Miyake, Yamanashi, all of Japan

[73] Assignee: Fanuc Ltd., Minamitsuru, Japan

[21] Appl. No.: 474,121

[22] PCT Filed: Sep. 7, 1989

[86] PCT No.: PCT/JP89/00921
§ 371 Date: May 2, 1990
§ 102(e) Date: May 2, 1990

[87] PCT Pub. No.: WO90/02978
PCT Pub. Date: Mar. 22, 1990

[30] Foreign Application Priority Data
Sep. 14, 1988 [JP] Japan .................... 63-230931

[51] Int. Cl.$^5$ .......................................... G05B 19/18
[52] U.S. Cl. .......................................... 318/569
[58] Field of Search ............ 318/569, 570, 572, 571, 318/568.25, 573, 567, 603, 636, 615

[56] References Cited
U.S. PATENT DOCUMENTS

| | | | |
|---|---|---|---|
| 4,603,286 | 7/1986 | Sakano | 318/615 |
| 4,643,622 | 2/1987 | Winski | 318/569 |
| 4,647,826 | 3/1987 | Ota | 318/603 |
| 4,680,697 | 7/1987 | Kiya et al. | 318/568.25 |
| 4,706,003 | 11/1987 | Nakashima et al. | 318/636 |
| 4,914,364 | 4/1990 | Hirai | 318/590 |
| 4,941,104 | 7/1990 | Teshima et al. | 318/569 X |

Primary Examiner—William M. Shoop, Jr.
Attorney, Agent, or Firm—Staas & Halsey

[57] ABSTRACT

Provided is a numerical control method in an apparatus having a C-axis control function for numerically controlling a spindle in the direction of rotation. The method includes providing a first G-code word (Gg1) for achieving agreement between axis control characteristic values of a C-axis motor control system and axis control characteristic values of a feed-axis motor control system, as well as a second G-code word (Gg2) for restoring axis control characteristic values changed by the first G-code word to original values, making spindle control characteristic values agree by commanding the first G-code word before controlling the C axis at the same time as the feed axis, and restoring to original values the spindle control characteristic values changed by the first G-code word by commanding the second G-code word after simultaneous control of the C axis and feed axis ends.

1 Claim, 3 Drawing Sheets

FIG. I

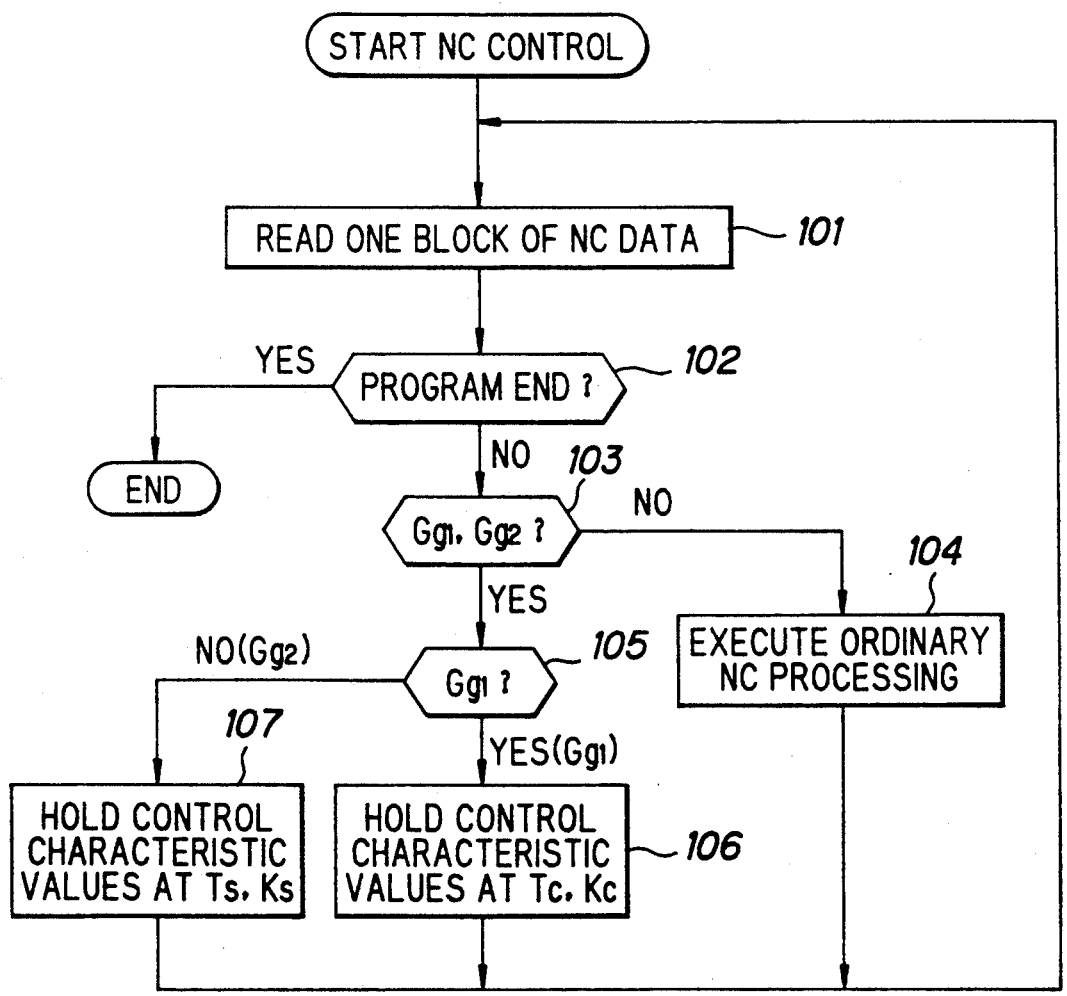

NUMERICAL CONTROL METHOD

BACKGROUND OF THE INVENTION

1. Field of the Invention

This invention relates to a numerical control method and, more particularly, to a numerical control method in an NC apparatus having a C-axis control function for positionally controlling a spindle in the direction of rotation.

2. Description of the Related Art

In a machine tool having a spindle motor, there are cases where a blank is subjected to predetermined machining while positional control is performed by a spindle motor in the same manner as with a servomotor. In a lathe, for example, a blank is subjected to drilling or grooving by positionally controlling a spindle, namely the blank, in the direction of rotation (C-axis direction), or the blank is subjected to machining such as helical grooving by simultaneously transporting a cutter while the blank is being rotated in the C-axis direction by numerical control.

It is difficult to make the servo-loop gain or acceleration/deceleration time constant in the spindle motor control system agree with the servo-loop gain or acceleration/deceleration time constant in the servomotor (feed motor) control system, and these values usually are different. Consequently, in a case where the amounts of delay in the motors differ from each other and C-axis control is performed at the same time as control along the other feed axis, the actual path of movement becomes displaced from the command path of movement owing to the disparity in the amounts of delay.

Accordingly, it has been contemplated, solely for cases where a changeover is made from velocity control in which a spindle is rotated at a fixed velocity to C-axis control, to manually set the characteristic values (acceleration/deceleration constant, servo-loop gain, etc.) of feed-motor axis control so as to agree with those of the spindle motor, and restore the characteristic values of spindle control to their original values at the end of C-axis control. However, this approach is troublesome since the manual changeover must be made manually whenever control is changed over.

Accordingly, an object of the present invention is to provide a numerical control method in which axis control characteristic values of a spindle motor and servomotor can be made to agree and then be restored to original values automatically.

SUMMARY OF THE INVENTION

In the present invention, the foregoing object is attained by preparing a first G-code word for achieving agreement between axis control characteristic values of a C-axis motor control system and axis control characteristic values of a feed-axis motor control system, as well as a second G-code for restoring axis control characteristic values changed by the first G-code wor to original values, commanding the first G-code word before performing simultaneous control of the C axis and feed axis, causing the axis control characteristic values of the feed motor control system to agree with the axis control characteristic values of the C-axis motor control system by the first G-code word, commanding the second G-code word after simultaneous control of the C axis and feed axis ends, and restoring the axis control characteristic values of the feed motor control system to original values by the second G-code word.

BRIEF DESCRIPTION OF THE DRAWINGS

FIG. 5 is a flowchart of processing according to the present invention.

DESCRIPTION OF THE PREFERRED EMBODIMENTS

Figure 1:
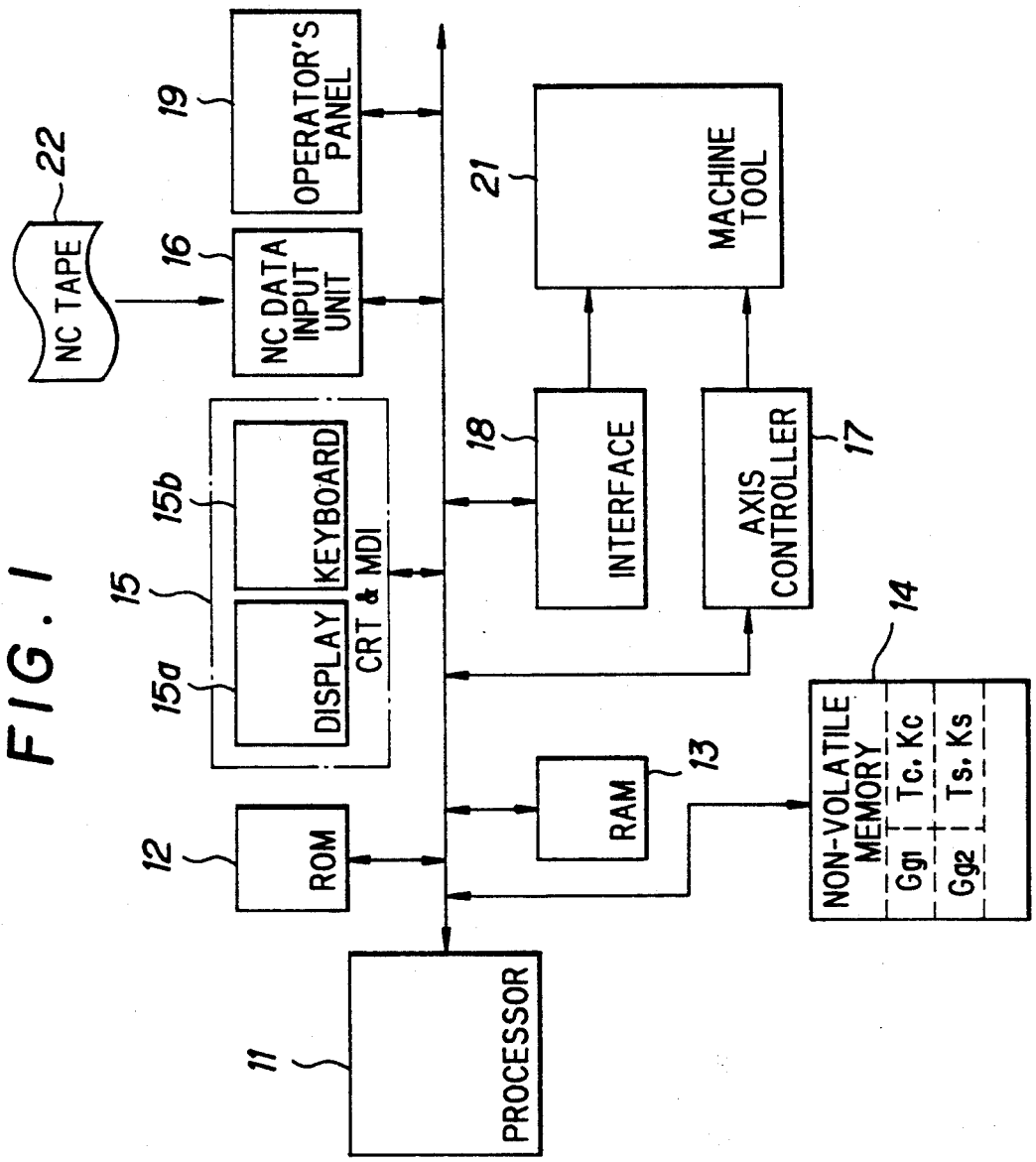
FIG. 1 is a block diagram of a numerical control apparatus according to the present invention.
Figure 2:
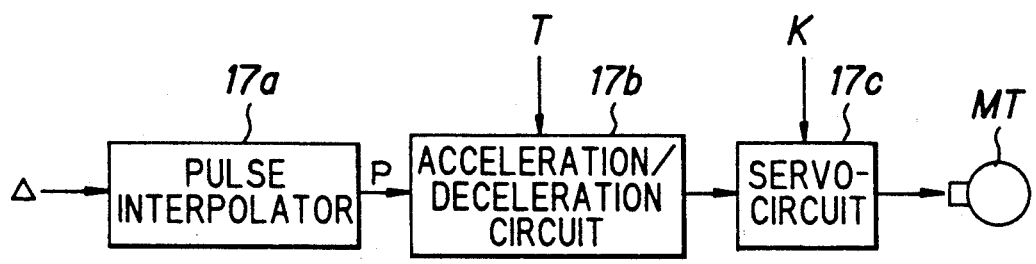
FIG. 2 is a block diagram of an axis controller.

FIG. 1 is a block diagram of an NC apparatus according to the present invention, in which numeral 11 denotes a processor, 12 a program memory (ROM) storing a control program, 13 a RAM for storing results of processing as well as an NC program being executed, 14 a RAM (non-volatile memory), backed up by a battery, for storing axis control characteristic values, described below, 15 a CRT/MDI unit having a display device 15a and a keyboard 15b, 16 an NC data input unit, 17 an axis controller, 18 an interface for outputting M-, S- and T-function instructions and the like, which have been commanded by the processor, to a machine tool, and for inputting various signals from the machine tool, 19 an operator's panel, 21 the machine tool, and 22 the NC tape. The axis controller 17 has a construction of the kind shown in FIG. 2 for each axis. Specifically, the axis controller 17 has a pulse interpolator 17a, to which an amount of movement Δ is inputted every predetermined sampling time, for performing a pulse interpolation operation in order to generate a pulse train P, an acceleration/deceleration circuit 17b, to which the interpolated pulse train and an acceleration/deceleration time constant is inputted, for gradually increasing pulse frequency when interpolated pulses are rising and decreasing pulse frequency when interpolated pulses are decaying, and a servo-circuit 17c having a dual feedback construction for position feedback and velocity feedback. The servo-circuit 17c receives the output of the acceleration/deceleration circuit 17b as well as the servo-loop gain, which are used to control motor MT.

Figure 3:
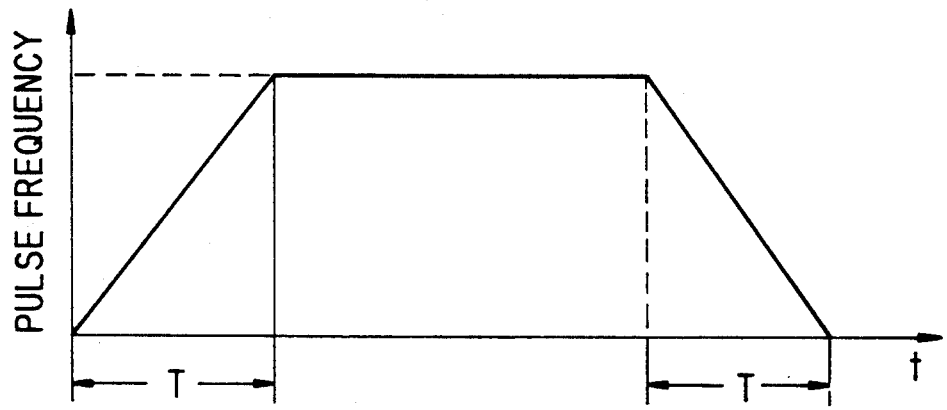
FIG. 3 is an acceleration/deceleration characteristic diagram.

FIG. 3 is a diagram showing the acceleration/deceleration characteristic of the acceleration/deceleration circuit 17b. T represents the acceleration/deceleration characteristic. The arrangement is such that the acceleration/deceleration characteristic of the feed axis is changed over by a G-code word, described below.

Figure 4:
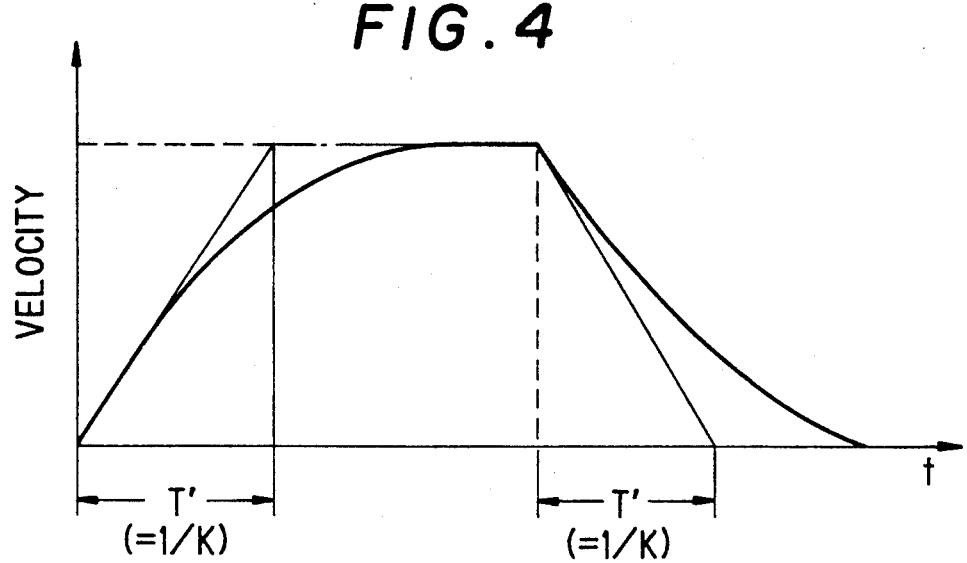
FIG. 4 is a primary delay characteristic of a servo-circuit.

FIG. 4 illustrates a primary delay characteristic, which is the servo characteristic of the servo-circuit 17c. T' represents the time constant of this characteristic, which is the reciprocal of servo-loop gain K. The servo-loop gain K of the feed axis is changed over by a G-code word, described below.

In the present invention, two G-code words "Gg1", "Gg2" (g1, g2 are arbitrary two-digit numerical values) are newly provided as G-function instructions.

The first G-code word "Gg1" changes over the acceleration/deceleration time constant Ts and the servo-loop gain $K_s$ of the feed-axis control system to a time constant Tc and a servo-loop gain Kc of the C-axis control system. The second G-code "Gg2" restores the acceleration/deceleration time constant and the servo-loop gain of the feed-axis control system to the original time constant $T_s$ and servo-loop gain $K_s$. The acceleration/deceleration time constants and servo-loop gains are stored in the non-volatile memory 11 in correspondence with the G-code words Gg1, Gg2, as shown in FIG. 1.

FIG. 5 is a flowchart of processing according to the present invention. A method of changing axis control characteristic values according to the present invention will now be described in accordance with this flowchart. It should be noted that an NC machining program has already been read from the NC tape 22 and stored in the RAM 13. Further, initially the acceleration/deceleration constant and servo-loop gain of each feed axis control system have been set to $T_s$, $K_s$, respectively, and the acceleration/deceleration constant and servo-loop gain of the C axis have been set to $T_c$, $K_c$, respectively.

When memory operation starts, the processor 11 reads an i-th block (the initial value of i is 1) from the RAM 13 (step 101), checks the NC data to determine whether it is data (e.g., M02 or M30) indicative of the end of the program (step 102), and terminates NC control processing if the NC data is indicative of program end.

If the NC data does not indicate program end, however, the NC data is checked to determine whether it is the G-code word "Gg1" or "Gg2" (step 103). If the NC data is neither of these codes, ordinary numerical control processing is executed (step 104) and processing from step 101 onward is repeated.

If the data is "Gg1", or "Gg2", however, it is determined which code word represented by the data (step 105). If the code word is "Gg1", the acceleration/deceleration time constant of the feed-axis control system is changed from $T_s$ to $T_c$ and the servo-loop gain is changed from Ks to Kc. These are maintained until "Gg2" is commanded (step 106). Accordingly, servo-control of the feed axis is subsequently carried out in the axis controller 17 at the time constant $T_c$ and servo-loop gain $K_c$ being maintained. It should be noted that commanding "Gg1" means commanding simultaneous control of the feed axis and C axis by subsequent NC data.

If the code word is "Gg2", the acceleration/deceleration time constant of the feed-axis control system is changed from $T_c$ to $T_s$, the servo-loop gain is changed from $K_c$ to $K_s$ (restored to the initial value), and these are subsequently maintained until "Gg1" is commanded (step 107). Accordingly, servo-control of the feed axis is subsequently carried out in the axis controller 17 at the time constant $T_s$ and servo-loop gain $K_s$ being maintained. It should be noted that commanding "Gg2" means simultaneous control of the feed axis and C axis is not commanded by subsequent NC data.

When the processing of step 106 or step 107 ends as a result of the foregoing, the program returns to step 101 and the foregoing processing is repeated.

The following is an example of an NC machining program in accordance with the present invention:

N10 G01 X50.0;    (a)

N20 Gg1;          (b)

N30 G01X100.0 C50.0 F10.0;  (c)

N40 Gg2;          (d)

N50 G01 X150.0;   (e)

As will be understood from the foregoing NC machining program, "Gg1" is commanded before the simultaneous control block (c) of the C axis and feed axis (X axis), whereby the axis control characteristic values of the X axis (time constant and servo-loop gain) are made to coincide with those of the C axis. Further, "Gg2" is commanded in block (d) at the end of simultaneous control, so that the axis control characteristic values of the feed axis are restored to their original values. More specifically, the axis control characteristic values of the feed axis in blocks (a) through (e) of the above-described NC machining program become as follows:

block(a) ... $T_s$, $K_s$ block(b) ... $T_s$, $K_s \rightarrow T_c$, $K_c$ block(c) ... $T_c$, $K_c$ block(d) ... $T_c$, $K_c \rightarrow T_s$, $K_s$ block(e) ... $T_s$, $K_s$ In the foregoing, the arrangement is such that the axis control characteristic values of the feed axis are changed and made to agree with those of the C axis. However, it is also possible to adopt an arrangement in which the axis control characteristic values of the C axis are changed and made to agree with those of the feed axis.

In accordance with the present invention, it is arranged to provide a first G-code word for achieving agreement between axis control characteristic values of a C-axis motor control system and axis control characteristic values of a feed-axis motor control system, as well as a second G-code word for restoring axis control characteristic values changed by the first G-code word to original values, make the axis control characteristic values agree by commanding the first G-code word before performing simultaneous control of the C axis and feed axis, and restore the axis control characteristic values to original values by the second G-code word at the end of simultaneous control. As a result, axis control characteristic values of a spindle motor and servomotor can be made to agree and then restored to original values automatically. This makes it possible to perform highly accurate path control and to improve operability.

We claim:

1. A numerical control method in an apparatus having a C axis, a feed axis, and having a C-axis control function for numerically controlling a spindle in the direction of rotation, comprising the steps of:

defining a first G-code word for achieving agreement between axis control characteristic values including an acceleration/deceleration time constant and a servo-loop gain of a C-axis motor control system, and axis control characteristic values including an acceleration/deceleration time constant and a servo-loop gain of a feed-axis motor control system;

defining a second G-code word for restoring the axis control characteristic values changed by the first G-code word to original axis control characteristic values;

commanding the first G-code word before simultaneously controlling the C axis and the feed axis in order to make the axis control characteristic values agree;

simultaneously controlling the C axis and the feed axis;

commanding the second G-code word after simultaneous controlling of the C axis and the feed axis ends in order to restore the axis control characteristic values changed by the first G-code word to the original axis control characteristic values; and controlling at least one of the C axis and the feed axis using the original axis control characteristic values.

* * * * *

UNITED STATES PATENT AND TRADEMARK OFFICE
CERTIFICATE OF CORRECTION

PATENT NO. : 5,155,424
DATED : October 13, 1992
INVENTOR(S) : Sasaki et al.

It is certified that error appears in the above-identified patent and that said Letters Patent is hereby corrected as shown below:

Title Page, under [75] Inventors,

"Tako Sasaki" should be

--Takao Sasaki--.

Column 1, line 58, after "G-code" insert

--word--;

Column 1, line 59, "wor" should be --word--.

Column 2, line 31, after "tape."

start a new paragraph beginning with "The".

Signed and Sealed this

Sixteenth Day of February, 1993

Attest:

STEPHEN G. KUNIN

*Attesting Officer*   Acting Commissioner of Patents and Trademarks